3 Sheets—Sheet 1.

J. W. DRUMMOND,

Assignor, by mesne assignments, to THE POSITIVE MOTION LOOM COMPANY.

Looms.

No. 8,953. Reissued Nov. 4, 1879.

Witnesses
Chas H. Smith
W. G. Mott

Inventor
John W. Drummond
The Positive Motion Loom Co. assignee
per L. W. Serrell atty

N. PETERS, PHOTO-LITHOGRAPHER, WASHINGTON, D. C.

3 Sheets—Sheet 2.

J. W. DRUMMOND,

Assignor, by mesne assignments, to THE POSITIVE MOTION LOOM COMPANY.

Looms.

No. 8,953. Reissued Nov. 4, 1879.

Witnesses
Chas. H. Smith
W. G. Mott

Inventor
John W. Drummond
The Positive Motion Loom Co.
Assignee
per L. W. Serrell
Atty

N. PETERS, PHOTO-LITHOGRAPHER, WASHINGTON, D. C.

J. W. DRUMMOND,

Assignor, by mesne assignments, to THE POSITIVE MOTION LOOM COMPANY.

Looms.

No. 8,953. Reissued Nov. 4, 1879.

Witnesses
Chas. H. Smith
W. G. Mott

Inventor
John W. Drummond
The Positive Motion Loom Co.
Assignee
per Lemuel W. Serrell atty.

N. PETERS, PHOTO-LITHOGRAPHER, WASHINGTON, D. C.

UNITED STATES PATENT OFFICE.

THE POSITIVE MOTION LOOM COMPANY, OF NEW YORK, N. Y., ASSIGNEE, BY MESNE ASSIGNMENTS, OF JOHN W. DRUMMOND.

IMPROVEMENT IN LOOMS.

Specification forming part of Letters Patent No. 40,685, dated November 24, 1863; Reissue No. 8,953, dated November 4, 1879; application filed September 11, 1879.

*To all whom it may concern:*

Be it known that JOHN WALLACE DRUMMOND, of the city and State of New York, did invent a certain new and useful Improvement in Looms for Weaving; and the following is declared to be a full, clear, and exact description of his said invention, reference being had to the annexed drawings, making part of this specification, wherein—

Figure 1:
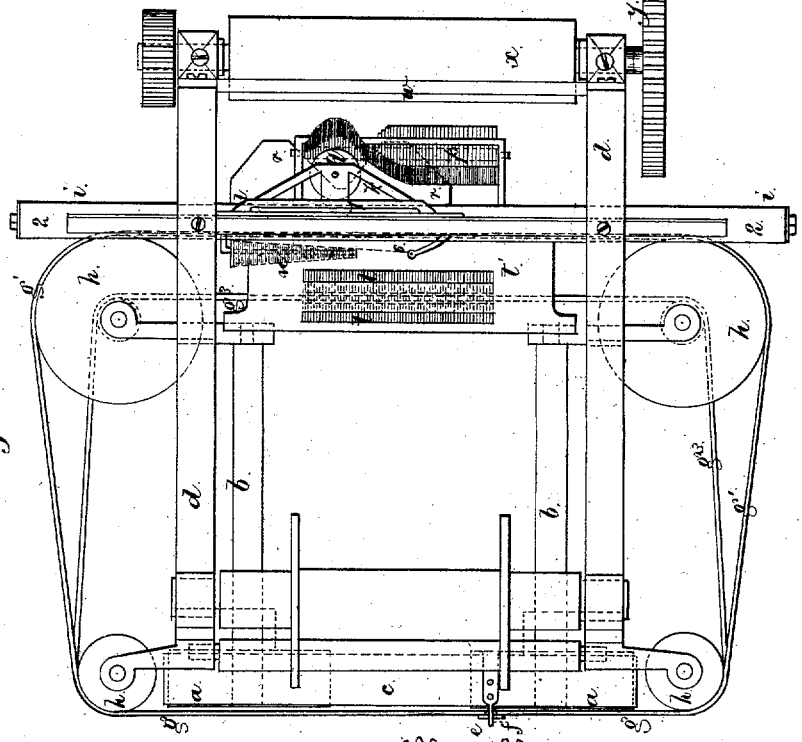
Figure 2:
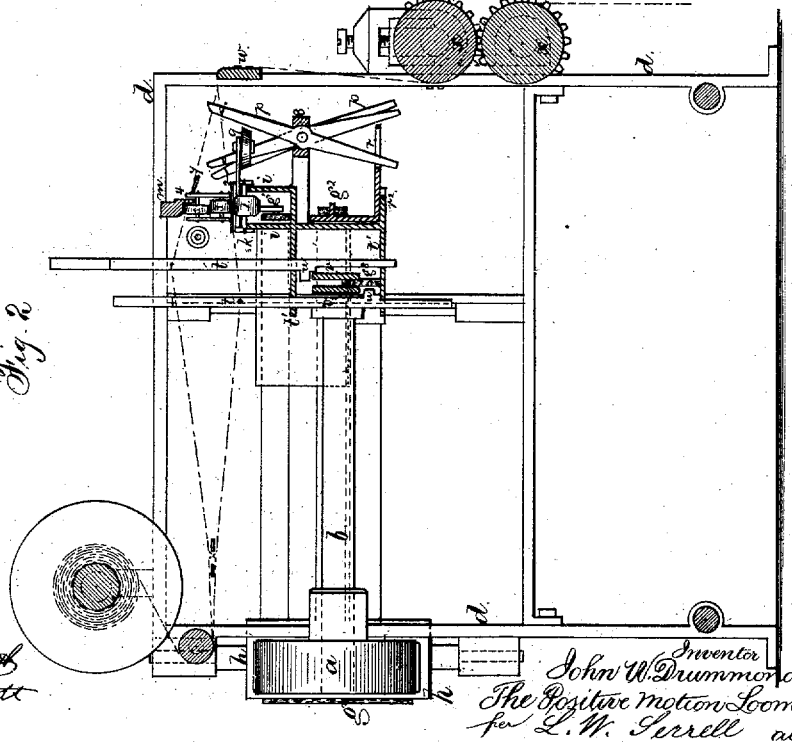
Figure 3:
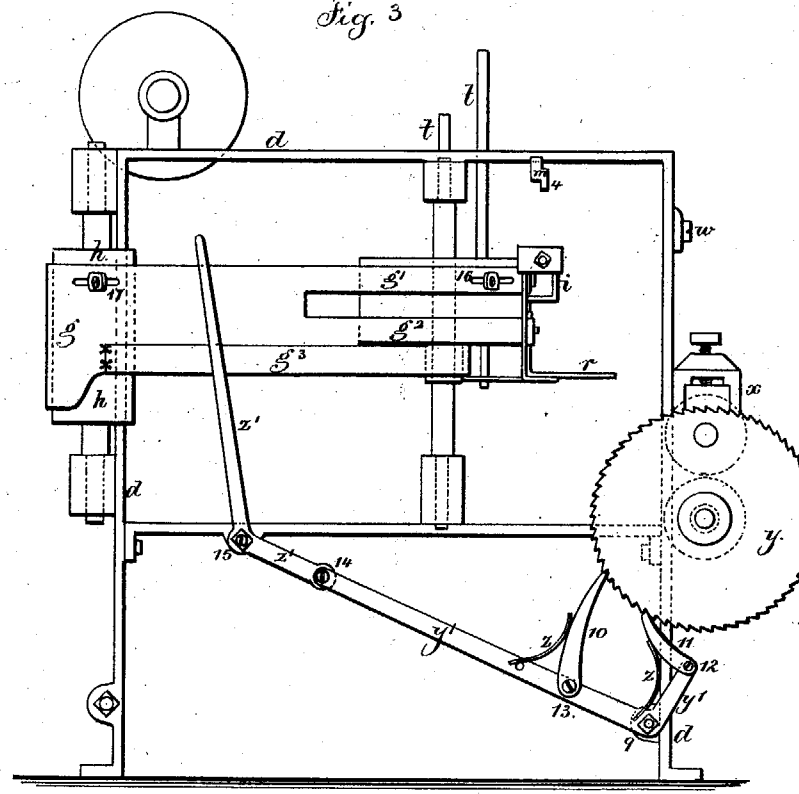
Figure 4:
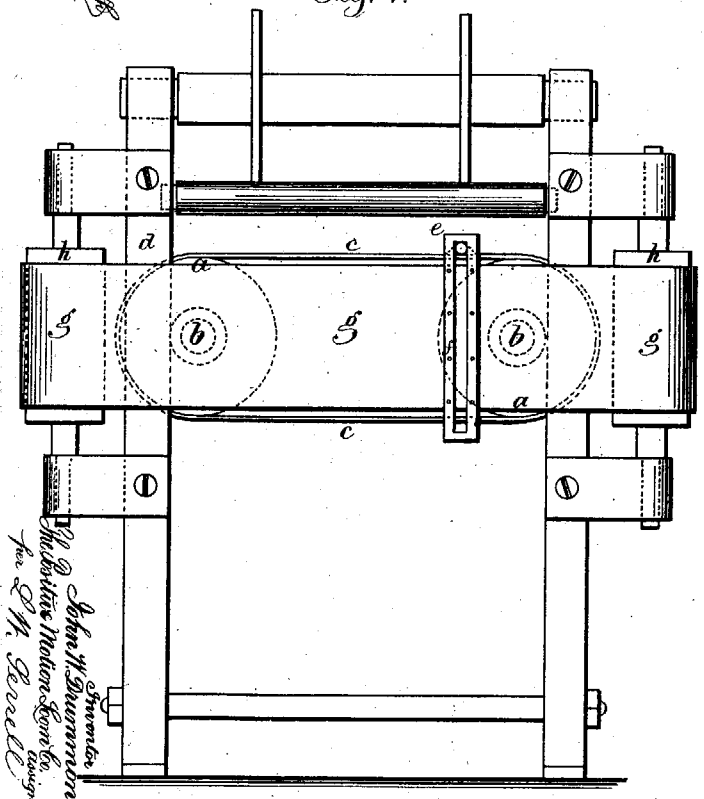
Figure 8:
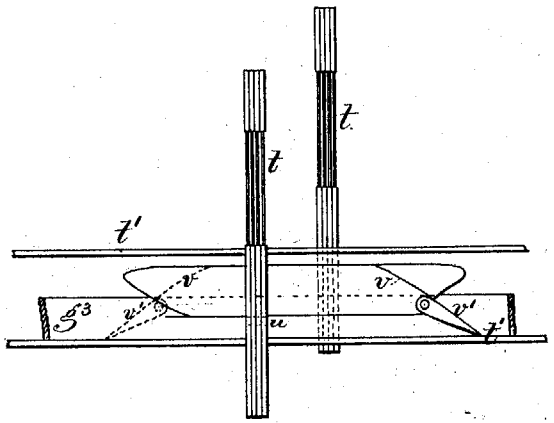
Figure 5:
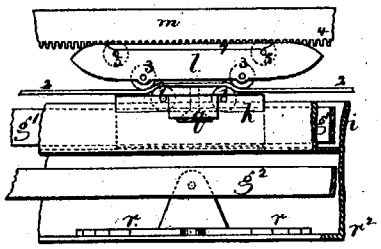
Figure 6:
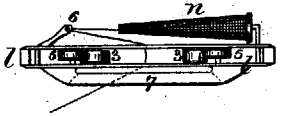
Figure 7:
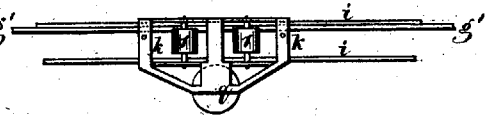

Figure 1 is a plan of the improved loom. Fig. 2 is a longitudinal section near the center of the loom. Fig. 3 is a side elevation, and Fig. 4 is an elevation at the back end of said loom. Fig. 5 is a detached elevation of the shuttle and shuttle-propeller. Fig. 6 is a plan of the shuttle. Fig. 7 is a plan of the shuttle driver or propeller, and Fig. 8 is an elevation of the heddles and their actuating-cams.

Similar marks of reference denote the same parts.

In the looms heretofore constructed the weaving operation has generally been performed in a manner to produce violent concussions. The shuttle is thrown by a blow, the lay comes up with concussion against the filling, and the heddles move suddenly in forming the shed of warp. These operations are very noisy, and produce great wear on the parts, and the concussions are injurious to buildings containing a number of looms.

This invention relates to mechanism for moving the shuttle progressively along the raceway without concussion by pressure that acts during the entire movement.

The heddles are opened and closed progressively by the action of cams, so as to form a shed where the shuttle is moving, and the weft-thread is pressed up progressively by lay-up plates.

In the drawings, *a a* are pulleys on shafts *b b*, sustained in the frame *d*, to one or both of which shafts rotation is communicated by any convenient means. *c* is an endless belt over these pulleys *a a*, on which is a crank pin or stud, *e*, that takes into a slot, *f*, in a belt, *g*, that passes around the rollers *h h*, and is connected to or formed with the portions $g'$, $g^2$, and $g^3$ of an endless belt, that are connected to and reciprocate in unison with the different portions of the mechanism.

It will now be understood that the stud *e* will communicate to this belt *g* a reciprocating movement, and that the extent of said movement will be determined by the distance across from the outside of one pulley *a* to the outside of the other, and that the various devices connected to the said belt will receive a motion of a corresponding extent. Hence it is here observed that the extent of motion is to be as much as the width of the fabric to be woven added to rather more than the length of the shuttle employed, and the arrangement of the belt *g* or the position of the belt *c* relatively to the rest of the loom is in no manner limited, so long as the reciprocations, to the extent aforesaid, are communicated to the parts hereinafter described. The pin *e*, as it moves with the belt around the pulley *b*, travels in the slot *f*, and gradually stops and starts the belt *g* and the parts receiving motion therefrom.

*i i* are slideways on which the shuttle-carrier *k* travels. This carrier *k* is provided with rollers 1 1, (see plan, Fig. 7,) and is reciprocated across the loom by a connection to the portion $g'$ of the belt *g*, or otherwise.

2 is a horizontal fixed belt drawn across over the shuttle-carrier, and extending from end to end of the ways *i i*, slightly above them, and securely fastened at the ends.

*l* is the shuttle, that is formed as an open frame, (see Fig. 6,) with rollers 3 3, the axes of which are farther apart than those of the rollers 1 1; and 4 is a rib extending down from the cross-bar *m*; and 5 5 are rollers in said shuttle-frame, traveling behind the rib 4 and against the under side of *m*, so that the shuttle is guided by this rib 4 being between the front plate of the shuttle and the sides of these rollers 5 5.

By reference to Fig. 5, in which the shuttle and driver are shown separately, it will be seen that the rollers 1 1 of the driver form a ridge in the belt 2, and hence that the shuttle itself is driven by the progression of that ridge from side to side, acting upon the rollers 3 3 in the said shuttle, thus driving the shuttle by means of the shuttle-driver, although the belt 2 intervenes and remains stationary, the object of this being that the warps may lie upon this belt undisturbed, notwithstanding the motion given through that belt to the shuttle, the rollers 3 3 traveling over the warps.

It will be apparent that one of the rollers 1 acts to move the shuttle when the same is carried in its race in one direction, and that the other roller 1 acts when the shuttle is being moved the other way, and that the operative roller, moving against the belt, receives a positive rotary motion on its own axis independent of any other mechanism, and that the travel of its surface corresponds to the movement of the shuttle along its race.

The warps are raised by any suitable device. That hereinafter described is, however, preferred; and the rib 4 is notched to form fine smooth teeth at the parts where the warps pass through, so that the warps of the upper shed shall be received in such teeth, and not be injured by the passage of the shuttle.

The shuttle itself carries the filling or weft thread, *n* being the bobbin, from which the thread passes through an eye, 6, thence across through holes in the shuttle to the long delivery-slot 7, formed at the upper edge of the shuttle, so that the filling-thread will pass off near the under side of the top shed of warps, and be deposited between the laying-up device and the cloth as the same lies over the breast-beam, in order that said laying-up device may press the filling-thread up to the cloth.

Having thus described the mode of depositing the thread by the regular progressive movement of the shuttle without the concussion due to sudden stopping or starting, the lay-up apparatus for pressing the weft-thread to its place will be next described.

*p p* are plates that correspond in thickness to the distance from the center of one warp-thread to the center of the next; but the upper parts of these plates are made thinner, so as to pass freely between the warps, similarly to the reeds of a lay. A series of these plates, corresponding in number with the warps, extends across the machine in such a position that the top part of one plate may come between each two warps; and these plates are fitted on a center bar or rod, 8; or they might be fitted to slide back and forth, the object being that they shall be drawn back at the point where the shuttle is passing, in order that the filling-thread may be laid in by the slot 7 over their upper ends, and between them and the cloth, and as near to the cloth as convenient, and then that said lay-up be caused to press said thread up to place by a movement that acts progressively from end to end of the filling. The mechanism that presses these lay-up plates forward is to travel with the shuttle, and may be so located as to press up the said filling-thread as soon as it is laid; or it may act upon the return movement of the shuttle, previous to the laying in of the next weft-thread.

A cam-formed projection, *q*, upon the shuttle-driver *k* acts to press the upper part of the plates *p* forward as said driver is reciprocated across the loom, and this projecting cam *q* may be armed with a roller to relieve the friction of acting upon the plates *p*, and a double cam, *r*, attached to a part, $g^2$, of the belt *g*, and traveling upon a ledge, $r^2$, acts upon the lower ends of the plates *p*, to throw their upper ends back toward the shuttle-slides *i*, so that the weft-thread may pass over their upper ends as the shuttle passes along.

The normal condition of these plates *p* is with their upper ends toward the slideways *i i*, and the weft-thread draws off through the long slot 7, and will hence always deliver at the hindmost or rear end of said slot after the upper ends of the plates *p* have been pressed by the cam *r* back toward said slideways, and said slots 7 being higher than the ends of said plates *p*, the filling-thread will pass over and in front of their upper ends, and be deposited between them and the point to which the filling is driven to form the cloth.

It is here remarked that in the construction represented the filling-thread passes off from the rear end of the shuttle, and hence is not driven up until the shuttle returns; but if the weft-thread were delivered from an eye at the end of an arm extending from the center of the shuttle, and the cams *q* and *r* transposed in position, the weft might be driven up as soon as delivered from the shuttle.

In order to actuate the heddles the part $g^3$ of the belt *g* is employed, and the heddles themselves are made of thin metallic plates or strips *t t*, set to slide vertically in suitable guides *t'*. Each plate is perforated for the passage of its warp, and is provided with an arm, *u*, and said plates are so placed that the arms *u* project from the two rows of heddles inward or toward each other, and when the warps are level said arms are a little above the lower guide *t'*. The part $g^3$ of the belt *g* runs between these heddles, and may be guided at the top and bottom edges in grooves in the guides *t'*. Upon opposite sides of this belt are fixed cams *v v*, (see the detached Fig. 8,) provided with hinged inclines or switch-bars *v'*, which are placed at opposite ends of said cams. The action of these is that, as the belt $g^3$ reciprocates, the switch *v'*, which is advancing, acts under the arms *u* of one range of heddles, raising them and the warps to the necessary height, where they remain elevated on the cam *v*, and hold the warps up over the shuttle, and when said shuttle and cams *v* have passed, the warps drop to their normal position. During this same time the warps in the plates forming the other heddle have either remained stationary or been depressed, the cam *v* having passed over said arms *u*, and the switch *v'* having been raised by such arms, and running back over them.

When the reverse movement of the belt $g^3$ takes place the heddle-plates that had before remained in a normal position or been depressed are raised by the hinged incline $v'$ acting under their said arms $u$ $u$, while the heddle-plates that had been raised are depressed, or remain in a normal position. Each cam $v$ is formed with an incline on its under edge at the end opposite the switch $v'$, so as to pass over the arms $u$ of the heddles when the cam is moving with that end first, and the heddles may be depressed by that means to draw down the lower shed of warp. The cloth, as woven, passes over the breast-beam $w$ and between the rollers $x$ $x$, that are pressed together by springs and screws or otherwise, so as to gripe and draw the cloth along as woven. These rollers are to be geared together, and a ratchet-wheel, $y$, is provided, the teeth of which bear such a relation to the size of the roller, to which the wheel is connected directly or by intermediate gearing, that the movement of said wheel to the extent of one tooth draws the fabric along two picks, or the width of two filling-threads. This wheel $y$ is actuated half a tooth each reciprocation of the loom by the pawls 10 and 11, hinged at 12 and 13 to the bent lever $y'$. (See Fig. 3.) $z$ $z$ are the springs for such pawls, and 9 the fulcrum of $y'$.

$z'$ is a bent lever on the center 15, and attached to $y'$ by a screw and slot at 14, or similar device. 16 and 17 are adjustable tappets or studs affixed to the belt $g$ $g'$, and projecting sufficiently therefrom to take the upper end of $z'$. The position of these tappets is such that one of them takes against the side of $z'$ at the time the belt has to move as much before commencing its return reciprocation as the upper end of said lever $z'$ has to be moved. By this arrangement, when the tappet 17 takes the lever $z'$ the pawl 11 moves the wheel $y$ half a tooth, and on the return movement the tappet 16 causes the pawl 10 to move the wheel $y$ half a tooth, and carry the pawl 11 back sufficiently to take the next tooth on said wheel $y$, so that the take-up is a positive movement acting each reciprocation of the shuttle.

What is claimed as the invention of the said JOHN W. DRUMMOND, and desired to be secured by Letters Patent, is—

1. In combination with the heddles having arms $u$ $u$, the cams $v$, switches $v'$, and mechanism for moving the cams $v$ endwise, substantially as set forth.

2. The lay-up plates $p$ $p$, composed of levers centrally pivoted, in combination with the mechanism acting above and below the fulcrum, substantially as set forth, for moving such plates, and a shuttle for supplying the weft-thread, and means for moving the same, as specified.

3. A shuttle having smooth rollers at its opposite sides, and rolling between and in contact with the warps, in combination with a shuttle-driver constructed substantially as described, whereby one of its rollers, acting upon one of the shuttle-rollers, presses the shuttle along the raceway, as set forth.

4. A shuttle having four rollers, two in the upper part and two in the lower part, in combination with a shuttle-driver having two rollers, one of which acts to move the shuttle in one direction and the other to move the shuttle in the other direction, and means for moving the shuttle-driver, substantially as set forth.

5. The shuttle-driver consisting of a carrier and rollers, together with mechanism for imparting to the operative roller a positive independent rotary motion on its own axis as it is moved along the race, substantially as set forth.

6. A shuttle-driver having two rollers, in combination with a shuttle having rollers, and mechanism for imparting to both rollers of the driver a positive independent rotary motion on their own axes as the carrier is moved along the race, substantially as set forth.

7. The combination, in a loom, of a raceway in which the shuttle is moved progressively first in one direction and then in the other, a shuttle having rollers at its upper and lower sides, a shuttle-driver below the warps, provided with rollers to give motion to the shuttle, and means for moving the shuttle-driver first in one direction and then in the other, substantially as set forth.

8. The combination, with the reciprocating shuttle-driver and shuttle, of mechanism for reciprocating the shuttle-driver and gradually stopping and starting the movement at the ends of the stroke, substantially as set forth.

Signed this 10th day of September, A. D. 1879.

THE POSITIVE MOTION LOOM COMPANY, [L.S.]
By WILLIAM LYALL, *Secretary.*

Witnesses:
GEO. T. PINCKNEY,
WILLIAM G. MOTT.